US 8,198,850 B2

(12) United States Patent
Thomas et al.

(10) Patent No.: US 8,198,850 B2
(45) Date of Patent: Jun. 12, 2012

(54) DC MOTOR DRIVE

(75) Inventors: Gareth David Thomas, Newtown (GB); Michael Andrew Morgan, Newtown (GB)

(73) Assignee: Control Techniques Ltd., Newtown (GB)

(*) Notice: Subject to any disclaimer, the term of this patent is extended or adjusted under 35 U.S.C. 154(b) by 585 days.

(21) Appl. No.: 12/359,007

(22) Filed: Jan. 23, 2009

(65) Prior Publication Data
US 2009/0226154 A1  Sep. 10, 2009

(30) Foreign Application Priority Data
Jan. 25, 2008 (GB) .................................. 0801433.4

(51) Int. Cl.
*H02P 7/298* (2006.01)
(52) U.S. Cl. ........................ 318/504; 318/479
(58) Field of Classification Search ............. 318/400.01, 318/400.34, 432, 433, 459, 474, 478–480, 318/504, 508
See application file for complete search history.

(56) References Cited

U.S. PATENT DOCUMENTS

| 4,680,513 | A | * | 7/1987 | Kennedy ........................ 318/285 |
| 4,827,196 | A | * | 5/1989 | Odell ........................... 318/400.25 |
| 5,608,301 | A | * | 3/1997 | Inaniwa et al. ................. 318/729 |
| 5,920,168 | A | * | 7/1999 | Lewis ........................... 318/471 |
| 6,038,142 | A | | 3/2000 | Fraidlin et al. |
| 7,489,097 | B2 | * | 2/2009 | Fu et al. ..................... 318/400.01 |
| 2003/0075990 | A1 | | 4/2003 | Guitton et al. |
| 2006/0164872 | A1 | | 7/2006 | Fukumoto |
| 2007/0050159 | A1 | | 3/2007 | Ewers et al. |
| 2008/0129238 | A1 | * | 6/2008 | Andersen ..................... 318/565 |

FOREIGN PATENT DOCUMENTS

| DE | 3627858 | 2/1988 |
| DE | 3708479 | 11/1988 |
| DE | 3732334 | 4/1989 |
| DE | 29811832 | 9/1998 |
| FR | 2686748 | 7/1993 |
| FR | 2716757 | 9/1995 |

* cited by examiner

*Primary Examiner* — Bentsu Ro
(74) *Attorney, Agent, or Firm* — Harness, Dickey & Pierce, P.L.C.

(57) ABSTRACT

A DC motor drive (100) including power electronics (120) and control electronics (130). The power electronics (120) are arranged to receive a high voltage power supply and to controllably output that supply to a DC motor to controllably operate the motor. The control electronics (130) are arranged to receive a low voltage power supply and to control operation of the power electronics (120) and hence of the motor at least partly in response to signals received by the control electronics (130) indicative of at least one potential difference across the power electronics (120). The drive further includes a microprocessor (150) and an opto-coupler (170) arranged to sense the output of the power electronics (120) and to generate based thereon the signals in a form for optical transmission via opto-coupler (170) between the output of the power electronics (120) and the control electronics (130), thereby allowing galvanic isolation of the control electronics (30) from the power electronics (120). Forms of wireless transmission other than optical transmission are also disclosed.

13 Claims, 2 Drawing Sheets

DC MOTOR DRIVE

CROSS-REFERENCE TO RELATED APPLICATION

This application claims the benefit and priority of United Kingdom Patent Application No. 0801433.4 filed Jan. 25, 2008. The entire disclosure of the above application is incorporated herein by reference.

FIELD

This disclosure relates to a DC motor drive.

BACKGROUND

Existing DC motor drives are used to provide control of DC motors in many different applications. One such application, which could be considered a low-power application, would be the use of a DC motor to operate a simple conveyer belt in a factory. Another application, which could be considered a high-power application, would be the use of a DC motor to operate a rolling mill in a steel works. In applications such as these two, where control is to be exercised over the DC motor, a DC drive is provided. The DC drive contains electronic circuitry in the form of power electronics and control electronics to control the speed and torque of the DC motor.

In order to provide good control of the DC motor, the control electronics of the DC drive measure the high voltages present in the power electronics. This arrangement however has a potential safety risk: an operator of the DC drive who is necessarily working adjacent to the control electronics may be exposed to the high voltages of the power electronics by any connection between the power electronics and the control electronics needed to measure the high voltages. To address this, existing DC motor drives include a high-impedance circuit between the power electronics and the control electronics. This provides a good degree of isolation of the control electronics, and hence of the operator, from the power electronics. This isolation is based on having high impedance in the circuit which will limit any current flowing from the power electronics to the control electronics to a safe level.

An example of such an arrangement is shown in schematic form in FIG. 1. With reference to FIG. 1, a DC motor drive 10 includes a high voltage side and a low voltage side. On the high voltage side, which in this example is at approximately 400V, the drive 10 includes power electronics 20. An input side of the power electronics is connected to receive a three-phase power supply L1, L2, L3 and an additional power supply E1, E3. An output side of the power electronics 20 is connected to the armature winding A1, A2 of a DC motor (not shown) and to the field winding F1, F2 of the DC motor. The power electronics 20 are for controllably applying the three-phase power supply L1, L2, L3 to the armature winding A1, A2, and for controllably applying the line voltages E1, E3 to the field winding F1, F2.

On the low voltage side, which in this example is not greater than 30 volts, the drive 10 includes control electronics 30. The control electronics 30 provides a user interface to an operator of the drive 10 and are operable to control the power electronics 20 and hence the DC motor.

Certain components and connections are provided between the high voltage side and the low voltage side of the DC drive 10. Firstly, a switched mode power supply SMPS is provided to power the control electronics 30 from the high voltage power supply E1, E3. In addition, current sensors 40 are provided that are connected to the control electronics and arranged to sense the current in each of the three phases of the three-phase power supply L1, L2, L3, and also in the field winding F1. Finally, a high-impedance circuit 50 is connected between the power electronics 20 and the control electronics 30 to measure the voltage in the power electronics 20 and to provide an indication of this to the control electronics 30 for use in controlling the power electronics 20.

A person operating the DC motor drive 10 will come into close proximity with the low-voltage side of the drive 10. It is therefore desirable to provide a good degree of isolation between the low-voltage side and the high-voltage side to minimise the risk of the operator becoming inadvertently exposed to high voltages and consequent injury. In the arrangement shown in FIG. 1, a good degree of isolation is provided: the high impedance circuit 50 provides a good degree of isolation between the high voltage side and the low voltage side; and the SMPS and each of the current sensors provides a very high degree of isolation between the two sides.

Nevertheless, it is desirable to improve further the safety of DC motor drives.

SUMMARY

According to one aspect of this disclosure, there is provided a DC motor drive including power electronics and control electronics, the power electronics arranged to receive a high voltage power supply and to controllably output the supply to a DC motor to controllably operate the motor, and the control electronics arranged to receive a low voltage power supply and to control operation of the power electronics and hence of the motor at least partly in response to signals received by the control electronics indicative of at least one potential difference across the power electronics, wherein the drive further includes signal generation and transmission means arranged to sense the output of the power electronics and to generate based thereon the signals in a form for wireless transmission between the output of the power electronics and the control electronics, thereby allowing galvanic isolation of the control electronics from the power electronics.

Thus, a very high degree of isolation between the low voltage side of the drive and the high voltage side of the drive is achieved and safety is correspondingly improved.

The term "wireless transmission" is used herein in a general sense to refer to transmission that does not require a continuous electrical conductor. It should not be interpreted as being limited to, for example, radio transmission and, in particular, should not be interpreted as being limited to any of the IEEE 802.11 standards in relation to which the term "wireless" is sometimes used.

The signal generation and transmission means may be arranged to generate the signals in the form of electromagnetic radiation for wireless transmission. The signals may therefore include radio signals and/or optical signals. The optical signals may include, for example, visible and/or invisible light, such as infra red or ultra violet light. The signal generation and transmission means may be arranged to generate the signals in the form of, for example, sound and/or magnetic flux. The signals may therefore include sound signals and/or magnetic signals.

The signal generation and transmission means may include processing means arranged to sense the output of the power electronics and to generate intermediate electrical signals indicative of at least one potential difference thereacross. The signal generation and transmission means may include conversion means arranged to convert the intermediate electrical signals into the signals in a form for wireless transmission.

Additional conversion means may be coupled to the control electronics and arranged to convert the signals in a form for wireless transmission back into electrical signals.

Alternatively an opto-coupler could be used to provide electrical to electrical transmission with a built in optical link.

The signal generation and transmission means may also be arranged to sense a current of the output of the power electronics and may be operable to generate additional signals in a form for wireless transmission indicative of this. Because of the galvanic isolation provided by the wireless link, the current can be measured by measuring the potential difference across an impedance. This is lower cost than the current sensor that would otherwise be needed in order to provide the desired isolation between the power electronics and the control electronics. The signal generation and transmission means may therefore include circuitry arranged to measure the potential difference across an impedance and calculate the current based thereon.

In an embodiment, the signal generation and control means is arranged to sense the output of the power electronics and to generate based thereon signals in a digital form suitable for transmission through an opto-coupler or similar isolating device between the output of the power electronics and the control electronics, thereby allowing galvanic isolation of the control electronics from the power electronics.

BRIEF DESCRIPTION OF THE DRAWINGS

A specific DC motor drive according to one embodiment of this disclosure is now described by way of example only and with reference to the accompanying drawings, in which.

SPECIFIC DESCRIPTION OF AN EXEMPLARY EMBODIMENT

Figure 1:
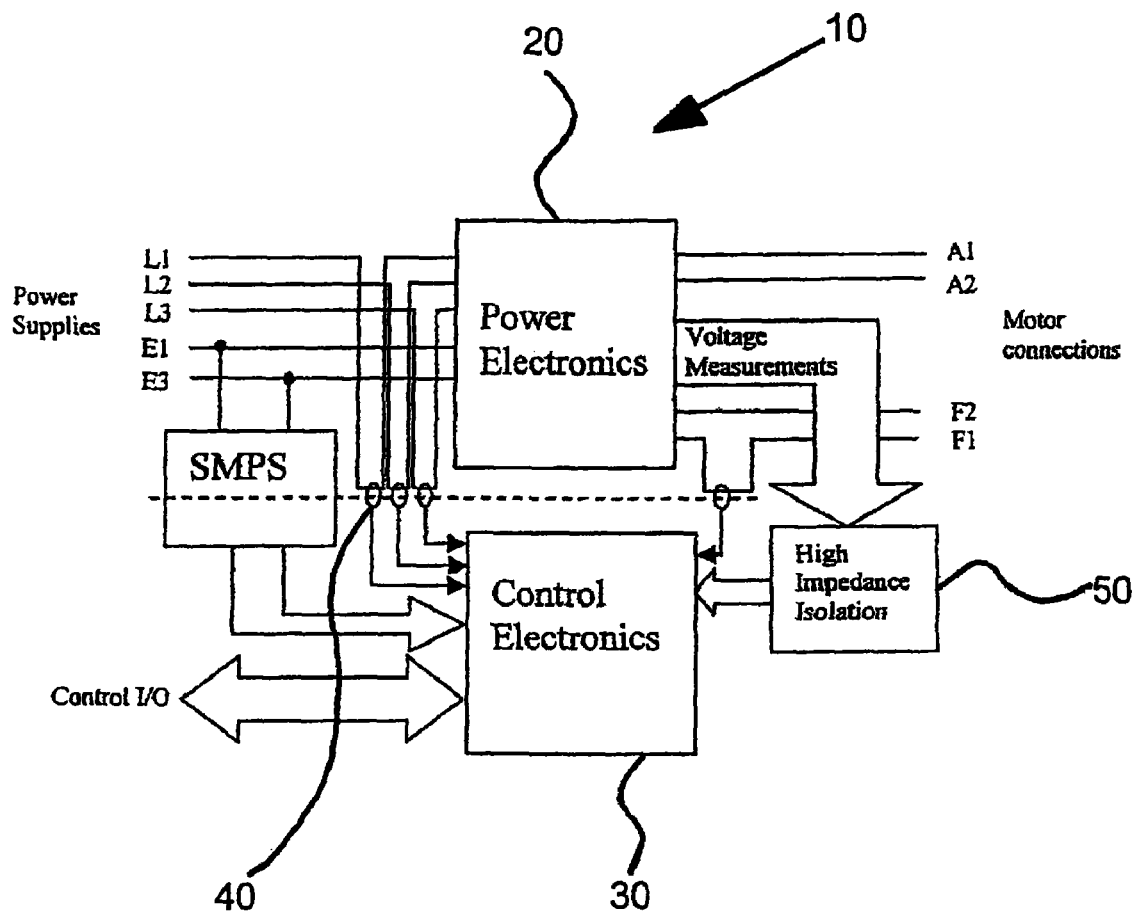
FIG. 1 shows in schematic form an existing DC motor drive.
Figure 2:
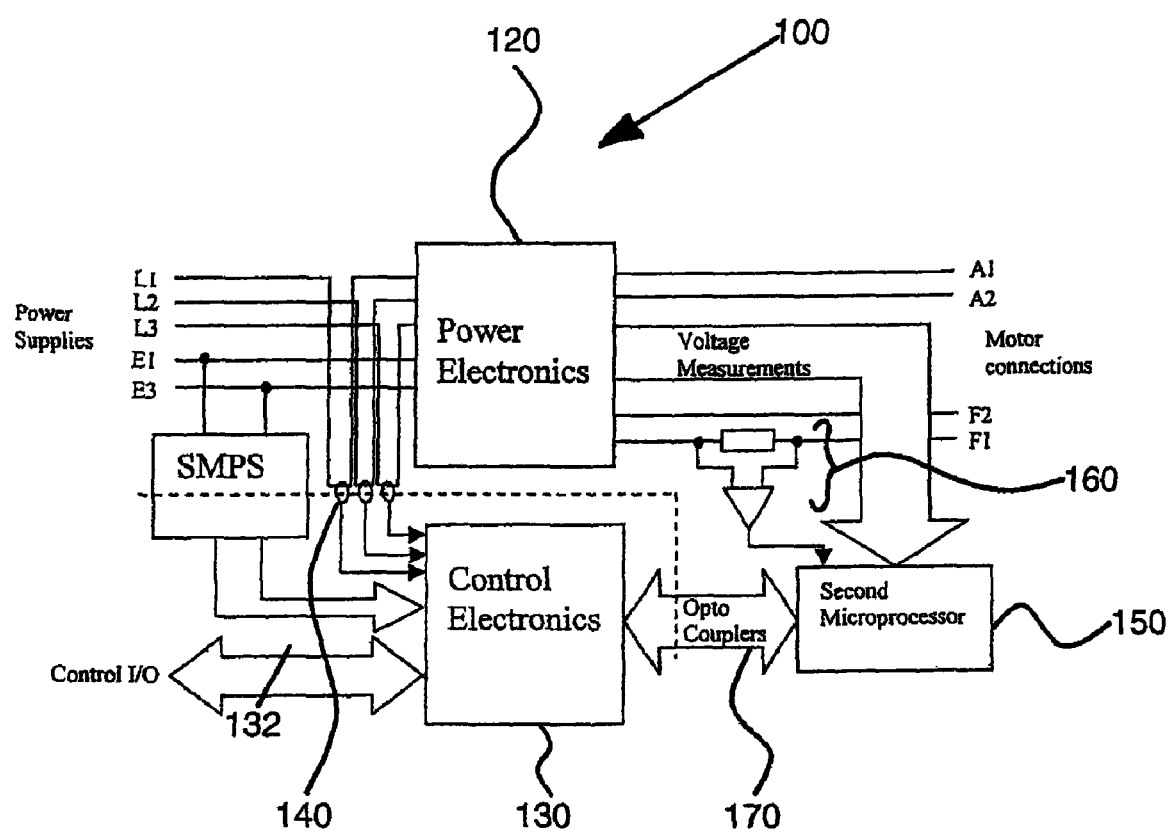
FIG. 2 shows in schematic form a DC motor drive according to one embodiment of the present disclosure.

FIG. 2 shows in schematic form a DC motor drive 100 for driving a DC motor (not shown). The drive 100 has certain components that are raised to a comparatively high electrical potential and certain components that are raised to a comparatively low electrical potential. The components raised to the higher potential can be considered as being on a high voltage side of the drive 100, and those at the lower potential can be considered as being on a low voltage side of the drive 100. Each side will be described separately.

On the high voltage side, the drive 100 has power electronics 120 and a DC motor (only the windings A1, A2; F1, F2 of which are shown). The power electronics are for controllably providing electrical power to the motor. An input side of the power electronics 120 is connected to receive a three-phase power supply L1, L2, L3 at the high voltage; and also to receive an auxiliary power supply E1, E3 also at the high voltage. Whilst the two power supplies are at the same high voltage in this embodiment, it is envisaged that they may be at different voltages in other embodiments. The three-phase power supply L1, L2, L3 is for use in powering operation of the motor, whilst the auxiliary power supply is for powering operation of the control electronics 130. In other embodiments, however, it is envisaged that the same power supply may be used for both of these. An output side of the power electronics 120 includes connections to two motor windings. These are armature winding A1, A2 and field winding F1, F2. Each of these windings is typically fed from a separate power electronic converter. The armature winding A1, A2 is fed by an armature converter, which in turn is fed by the three phase supply connected to L1, L2, L3. The field winding F1, F2 is fed by a field converter, which in turn is typically fed by the auxiliary supply E1, E3.

On the low voltage side, to which customer connections are made and for which secure isolation from the three phase mains supply is required, the drive 100 includes control electronics 130. The control electronics 130 are for controlling the power electronics 120 and hence the motor. The control electronics 130 include inputs and outputs 132 to a user interface (not shown) that is arranged to receive commands from a user and provide operation information to the user. The user interface is conventional and will therefore be described in no further detail.

Several components are provided that are connected between the high voltage side and the low voltage side of the drive 100. These will now be described.

The drive 100 includes a switched mode power supply SMPS. This is connected to draw high voltage electrical power from the auxiliary power supply E1, E3 that is connected to the input side of the power electronics 120 and to supply low voltage electrical power to the control electronics 130. It will be understood that a switched mode power supply is such that it maintains galvanic isolation of the control electronics from the auxiliary power supply E1, E3 to which it is connected.

The drive 100 also includes current sensors 140 arranged to detect the current in each of the three phases L1, L2, L3 of the three-phase power supply connected to the input side of the power electronics 120. The current sensors are connected to the control electronics 130 to provide thereto information indicative of the sensed current in each phase L1, L2, L3 of the three-phase power supply. The current sensors 140 are loop-type sensors that rely on a current being induced therein as a result of the action of a magnetic field set up around the conductor in which current is to be measured. Thus, there is also galvanic isolation between the three-phase power supply L1, L2, L3 and the control electronics 130.

The drive 100 further includes a microprocessor 150 on the high voltage side of the drive that is arranged to sense voltages in the power electronics 120. In this embodiment, the voltages between L1, L2 and between L1, L3; between A1 and A2; between E1 and E3 are monitored; In other embodiments, however, only certain of these voltages may be monitored. In other embodiments the voltage between F1 and F2 and between L2 and L3 may be monitored. The microprocessor 150 is arranged to output a digital signal at an output thereof that is indicative of the sensed voltage or a processed form of some or all of these signals.

Although, the microprocessor 150 is shown separately from the power electronics 120 in FIG. 2, it is envisaged that the microprocessor 150 may be integrated into the power electronics 120. Furthermore, although a distinction is being made in this description between the power electronics 120 and the microprocessor 150, it will be appreciated that the microprocessor, at least in this embodiment, is also a power electronic device.

The drive 100 also includes current sensing circuitry 160 for use in sensing the current in the field winding (F1, F2) of the motor. The circuitry 160 includes an impedance connected in series with the field winding F1, F2 and a monitoring circuit arranged to determine the potential difference across that impedance and to output to the microprocessor 150 a signal indicative thereof.

The microprocessor 150, is connected to the current sensing circuitry 160 and arranged to receive therefrom the signal indicative of the potential difference across the impedance.

The microprocessor 150 is further arranged to calculate from this, and from a knowledge of the value of the impedance, the current in the field winding F1, F2 and to output a digital signal indicative of that current or a processed form of that signal.

The drive 100 also includes two opto-couplers 170. An opto-coupler 170 is an integrated circuit having a photo diode connected to an input side thereof and a photo-sensitive transistor connected to an output side thereof. The arrangement is such that turning the photo diode on and off causes the photo-sensitive transistor to switch on and off. Thus an opto-coupler conveys a signal from its input to its output, but provides galvanic isolation between the two.

The first opto-coupler is arranged to transfer data from the low voltage control electronics to the power electronics. The second opto-coupler is arranged to transfer data from the power electronics to the low voltage control electronics.

In this embodiment, data from the low voltage control electronics to the power electronics includes: control information to ensure that the power devices in power electronics 120 are switched at the correct time relative to the three phase supply voltage waveform and the required motor control demand; the current demand signal for the armature and/or field winding of the motor; and control loop gains and time constants for the armature and/or field controller. Different data may be transferred in other embodiments.

In this embodiment, data from the power electronics to the low voltage control electronics includes: three phase supply L1, L2, L3 voltage magnitude and phase information; Auxiliary Supply E1, E3 voltage magnitude and phase information; Field winding F1, F2 current magnitude. In other embodiments the data transfer could also include Armature winding A1, A2 current magnitude. In further embodiments, different data may be transferred.

Thus, the opto-couplers 170 allow the control electronics 130 to be galvanically isolated from the power electronics 120, and so the low voltage side of the drive 100 is galvanically isolated from the high voltage side of the drive 100.

The operation of certain parts of the drive 100 will now be described. As, however, the supply of electrical power to the power electronics 120 and the control electronics 130 is conventional, this will not be described. The way in which an operator interacts with the control electronics and in which the control electronics controls the power electronics and thereby controls the motor, is also conventional and so will not be described.

In operation, the control electronics 130 interact with a user of the drive and exercises control over the power electronics and hence the DC motor in a manner that, from the foregoing description, will be apparent to the skilled addressee. The way in which the power electronics 120 and the control electronics 130 receive electrical power from the power supplies L1, L2, L3 and E1, E3 (respectively) will also be apparent to the skilled addressee. The way in which voltage on the high voltage side and current in the field winding F1, F2 is measured and conveyed to the low voltage side may, however, benefit from some explanation. This is therefore described below.

The current sensing circuitry 160 calculates the potential difference across the impedance thereof and outputs to the microprocessor 150 a signal indicative of this. The microprocessor 150 receives the signal from the current sensing circuitry 160 and calculates from this and from a knowledge of the value of the impedance the current in the field winding F1, F2. The microprocessor 150 then outputs at the output thereof a digital signal indicative of the current in the field winding F1, F2 or a processed form of that signal. In addition, the microprocessor 150 senses voltage in the power electronics 120 and outputs at the output thereof a digital signal indicative of this or a processed form of this signal.

The invention claimed is:

1. A DC motor drive including power electronics and control electronics,
the power electronics arranged to receive a high voltage power supply and to controllably output that supply to a DC motor to controllably operate the motor, and
the control electronics arranged to receive a low voltage power supply and to control operation of the power electronics and hence of the motor at least partly in response to signals received by the control electronics indicative of at least one potential difference across the power electronics,
wherein the drive further includes signal generation and transmission means arranged to sense the output of the power electronics, wherein the signal generation and transmission means includes circuitry arranged to sense a current of the output of the power electronics by measuring the potential difference across an impedance connected to the output of the power electronics and calculating the current based thereon, and to generate based thereon the signals in a form for wireless transmission between the output of the power electronics and the control electronics, thereby allowing galvanic isolation of the control electronics from the power electronics.

2. A DC motor drive according to claim 1, wherein the signal generation and transmission means are arranged to generate the signals in the form of electromagnetic radiation for wireless transmission.

3. A DC motor drive according to claim 1 or claim 2, wherein the signals include at least one of radio signals and optical signals.

4. A DC motor drive according to claim 3, wherein the optical signals include at least one of visible and invisible light, such as one of infra red and ultra violet light.

5. A DC motor drive according to claim 1, wherein the signal generation and transmission means are arranged to generate the signals in the form of at least one of sound and magnetic flux.

6. A DC motor drive according to claim 1, wherein the signal generation and transmission means include processing means arranged to sense the output of the power electronics and to generate intermediate electrical signals indicative of the at least one potential difference thereacross, where this data is then transmitted digitally across an isolation barrier to the control electronics where this data is used to perform closed loop current control.

7. A DC motor drive according to claim 1, wherein the signal generation and transmission means include processing means arranged to sense the output of the power electronics and to generate intermediate electrical signals indicative of at least one potential difference thereacross.

8. A DC motor drive according to claim 7, wherein intermediate electrical signals are digital signals.

9. A DC motor drive according to claim 7, wherein the signal generation and transmission means include conversion means arranged to convert the intermediate electrical signals into the signals in a form suitable for wireless transmission.

10. A DC motor drive according to claim 9, wherein additional conversion means are coupled to the control electronics and arranged to convert the signals to a form for wireless transmission back into electrical signals.

11. A DC motor drive according to claim 9 or claim 10, wherein the conversion means include one or more opto-couplers arranged to convert an input electrical signal to an intermediate optical signal and to convert the optical signal back to an output electrical signal, thereby isolating the input signal from the output signal.

12. A DC motor drive including power electronics and control electronics,
    the power electronics arranged to receive a high voltage power supply and to controllably output that supply to a DC motor to controllably operate the motor, and
    the control electronics arranged to receive a low voltage power supply and to control operation of the power electronics and hence of the motor at least partly in response to signals received by the control electronics indicative of at least one potential difference across the power electronics,
    wherein the drive further includes a signal generator and transmitter arranged to sense the output of the power electronics, wherein the signal generator and transmitter includes circuitry arranged to sense a current of the output of the power electronics by measuring the potential difference across an impedance connected to the output of the power electronics and calculating the current based thereon, and to generate based thereon the signals in a form for wireless transmission between the output of the power electronics and the control electronics, thereby allowing galvanic isolation of the control electronics from the power electronics.

13. A DC motor drive including power electronics and control electronics,
    the power electronics arranged to receive a high voltage power supply and to controllably output that supply to a DC motor to controllably operate the motor, and
    the control electronics arranged to receive a low voltage power supply and to control operation of the power electronics and hence of the motor at least partly in response to signals received by the control electronics indicative of at least one potential difference across the power electronics,
    wherein the drive further includes a signal generator arranged to sense the output of the power electronics, and an opto-coupler arranged to optically couple the output of the power electronics and an input of the control electronics, wherein the signal generator includes circuitry arranged to sense a current of the output of the power electronics by measuring the potential difference across an impedance connected to the output of the power electronics and calculating the current based thereon, the generator further arranged to generate based on the output of the power electronics, digital signals for optical transmission between the output of the power electronics and the control electronics via the opto-coupler, thereby allowing galvanic isolation of the control electronics from the power electronics.

* * * * *